J. E. WRIGHT.
REPRODUCER.
APPLICATION FILED APR. 25, 1917.

1,292,944.

Patented Jan. 28, 1919.
3 SHEETS—SHEET 1.

Inventor
John C. Wright
By his Attorneys
Kerr Page Cooper & Hayward

J. E. WRIGHT.
REPRODUCER.
APPLICATION FILED APR. 25, 1917.
1,292,944.
Patented Jan. 28, 1919.
3 SHEETS—SHEET 2.
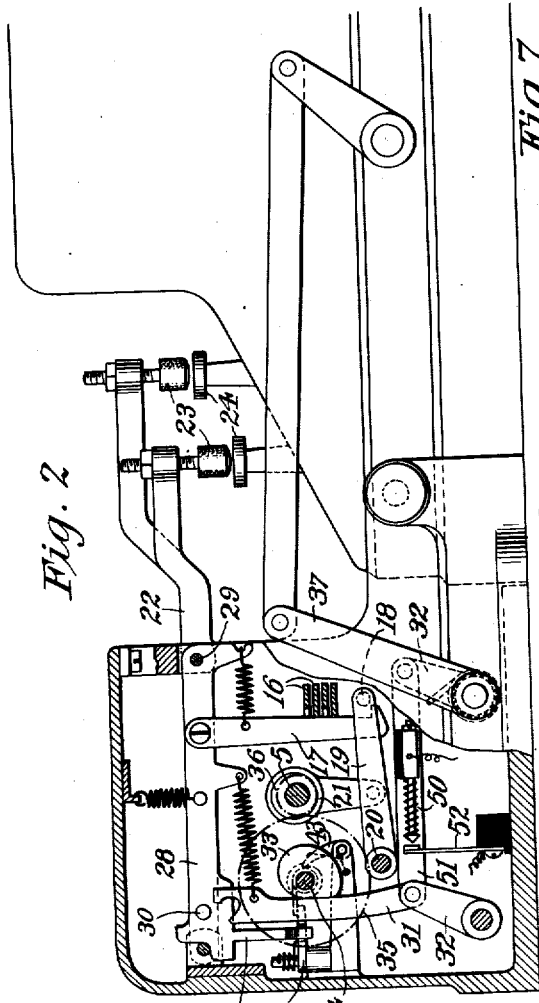
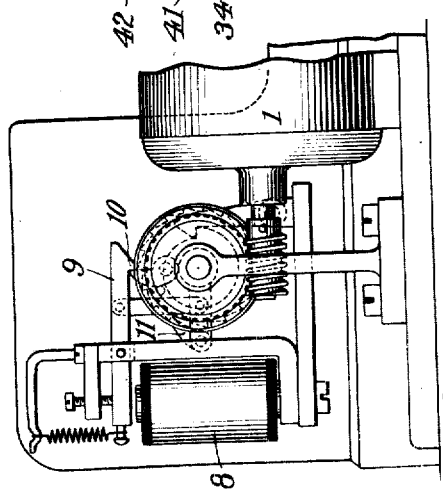
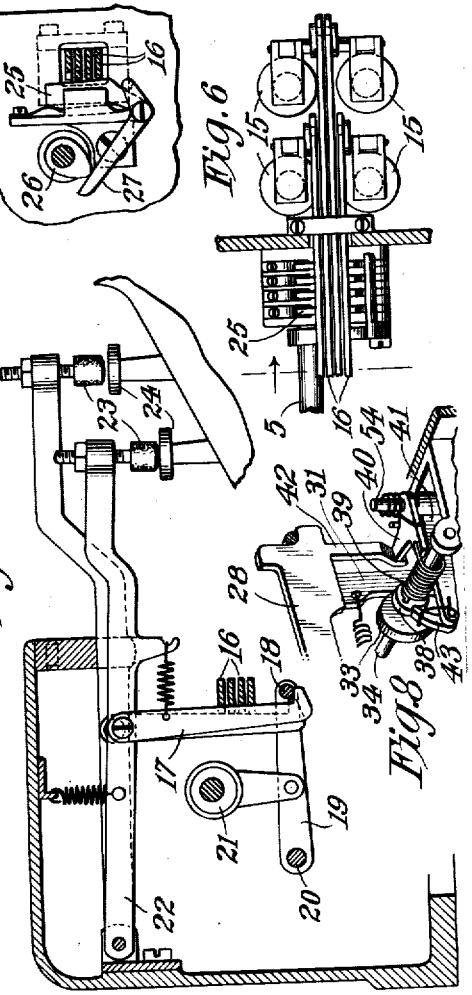
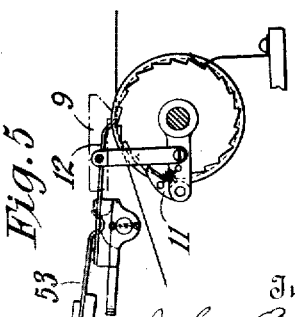
Inventor
John C. Wright
his Attorney

UNITED STATES PATENT OFFICE.

JOHN EDWARD WRIGHT, OF NEW YORK, N. Y.

REPRODUCER.

1,292,944.

Specification of Letters Patent.

Patented Jan. 28, 1919.

Application filed April 25, 1917. Serial No. 164,583.

*To all whom it may concern:*

Be it known that I, JOHN E. WRIGHT, a citizen of the United States, residing at New York, in the county and State of New York, have invented certain new and useful Improvements in Reproducers, of which the following is a full, clear, and exact description.

The invention upon which the present application for Letters Patent is based, pertains to computing systems and is embodied in new and improved means for controlling by means of punched cards or tape, apparatus designed for recording or reproducing the data corresponding to the character or positions of said perforations.

In order that the purpose and hence the nature of the various improvements involved in the practical carrying out of the invention as a whole may be more readily comprehended, a statement, of somewhat general character, of the system may be profitably made. For this purpose, let it be assumed that in a department store, where the character of the operations are such as to make tabulations and computations of the transactions highly important, but their extent is not such as to justify the use of the cumbersome and expensive machines ordinarily used for the purpose, each counter or department be provided with a simple form of perforator by means of which cards or a tape may be readily perforated by a salesman to indicate the amount of each sale.

Assuming that this record has been made on a continuous length of tape, the latter is periodically transferred to the cashier's department, where it is run through a reproducer which is operated by suitable mechanism according to the position of the holes to record the items and totals of the amounts or other data indicated by the punched holes in the tape. Such record may be made upon cards which are preserved as records of sales made over any given counter or in any given department.

In case the amounts of sales are punched in cards, these cards will have other perforations punched therein either in advance of or at the time of sales which indicate the department where the sale was made, their date or other necessary information, and these cards may be kept as permanent records or their indications may be totaled by the reproducer. If they are preserved and it becomes necessary at any time or for any purpose to select from a number of them those which contain the records for a certain date or for a certain department, they are run through a selector, which, operated according to the perforations in individual cards, selects and distributes them by a single operation so that all the cards of a certain kind or class may be immediately obtained.

The system may involve numerous other steps, the tape or cards may be punched to afford records of other facts or transactions, and the reproducer may make other and more elaborate records, as will be well understood by those using the system or skilled in the art to which it pertains, but for the purpose of the present case the above outline will serve to show the nature and general purpose of the subject.

From the above it is manifest that the system in its entirety involves virtually the combination or conjoint use of three separate instrumentalities.

First. A perforating machine adapted to selectively punch either cards or tape.

Second. A selecting mechanism in which the operations of a card holder and chute are so controlled as to separate out of a mass the cards of a certain class or character from such as are not wanted, and Third. A reproducer controlled by a perforated card or tape, which actuates suitable mechanism, such as the keys of an adding machine, causing it to reproduce in numerals or letters the totals of any record which corresponds to the holes punched, or other data according to the nature and requirements of the case.

In this application the detailed description of apparatus is that of the mechanism above referred to as the reproducer, that is the apparatus through which the tape or the series of perforated cards is passed and which, operated in accordance with the perforations therein, actuates the keys of an adding machine or other like instrumentality to total the amounts represented by the perforations, or to make such other record as the occasion may demand.

The claims herein are directed to the novel features of this device, the other elements of the system having been made the subjects of other applications.

In the accompanying drawings, Figure 1 is a plan view of the apparatus with portions of the casing removed.

Fig. 2 is a side view and part section of the working mechanism.

Fig. 3 is a detail of the same, showing the parts in a different relation.

Fig. 4 is a side view of the clutch mechanism between the motor and the apparatus.

Fig. 5 is a detail of releasing mechanism.

Fig. 6 is a top plan view of the means for actuating certain permutation bars.

Fig. 7 is a detail of the releasing mechanism for such bars.

Fig. 8 is a perspective of a controlling device for one of the operative cams.

Figure 1:
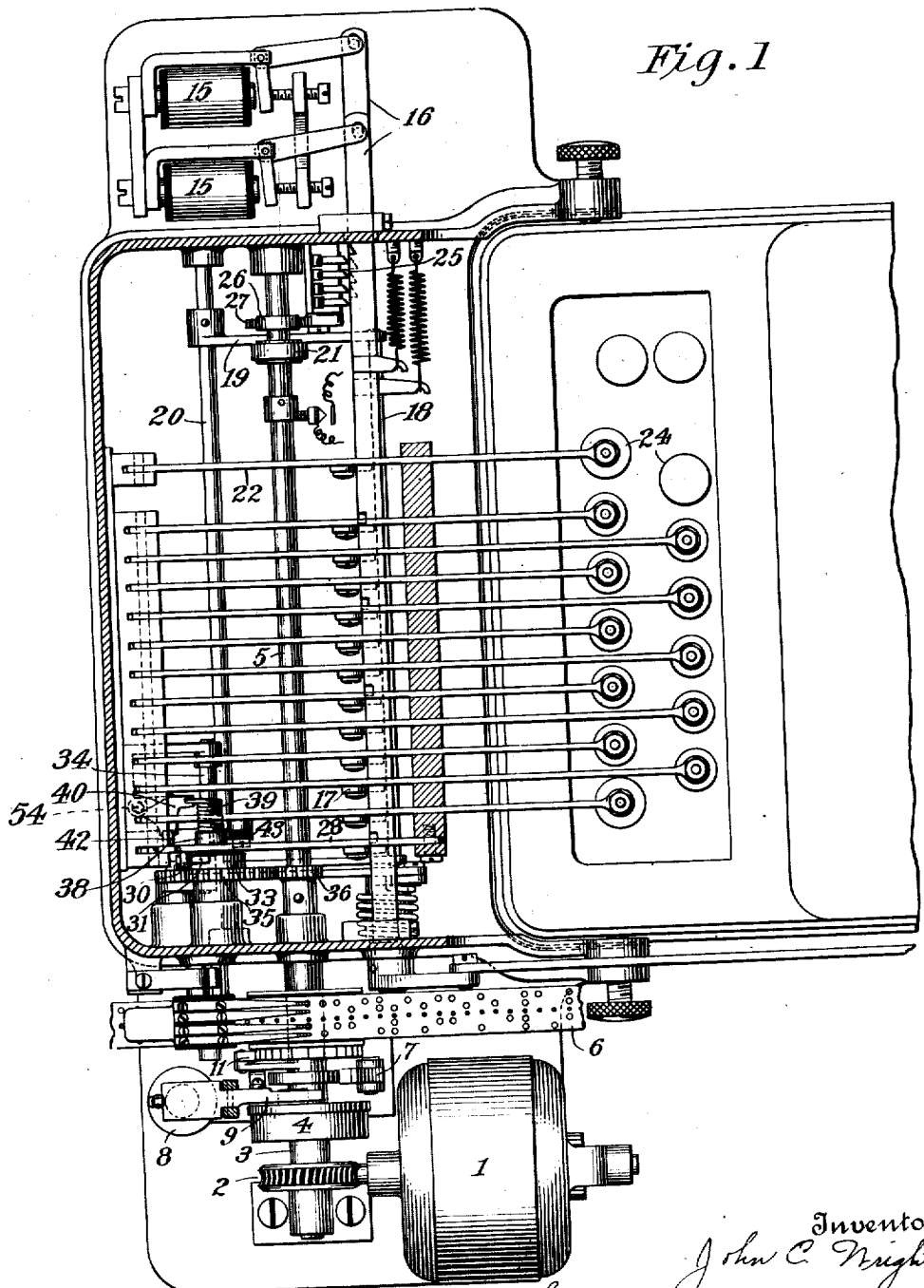

Generally described, the apparatus comprises a series of contacts under which a series of cards, or a perforated tape is intermittently moved, and these contacts control magnets that operate permutation bars that determine which of a series of levers shall operate to depress the key of an adding machine which is designed to make records corresponding to the perforations in the cards or tape. Other devices are employed, but they are of a nature that may best be explained by the detailed description of the machine which follows:

The apparatus is driven by a motor 1 which imparts rotation through a reducing worm gear 2 to a shaft 3. This shaft carries a suitable ball or other clutch 4 which, when operated, imparts a single revolution to a shaft 5, and a movement of one step to a perforated tape 6 by a suitable and known form of ratchet and pawl device 7. Normally the motor and one member of the clutch 4 run freely, but when an electromagnet 8 receives an impulse of current it lifts the end of an armature lever 9 which releases the latch 10 of the clutch and thus causes the latter to operate and impart a movement of rotation to the shaft 5 which is checked after one turn by the reëngagement of the lever 9 and the latch 10. On its upward or return movement the lever 9 operates the pawl 11 that imparts to the tape a one-step advance.

Upon a conducting portion or sleeve of the shaft 5 bears a series of contact strips 12, in this case four in number, and these lie in the paths in which perforations are punched in the tape, so that as the latter is advanced one or more or all of the contact strips will pass through the paper and touch the conducting shaft 5. Assuming, therefore, that the shaft 5 is intermittently rotated by the motor and clutch and that movements are imparted thereto whenever a row of perforations comes under the series of contacts, then by the active contacts 12 circuits will be established from battery 13, Fig. 9, to the shaft 5 through ground at 14 and through magnets 15 that correspond to the active contacts.

As shown in Fig. 1, the energization of any one of these magnets and consequent movement by its armature, shifts a corresponding permutation bar 16. The four bars of this series have notches therein at predetermined points and against them bears a series of spring actuated levers 17 in such position that a vertical row of notches will always be formed opposite to one of said levers 17 and permit that lever to swing forward into such notches until its hooked end passes under a bar 18 on a pivoted frame 19 centered on the axis of a shaft 20.

The shaft 5 carries a cam 21 that is connected to the side bars of the frame 19 and at each revolution of the shaft these side bars are depressed, causing the bar 18 to pull down that lever 17 which has advanced into the notches of the permutation bars. The levers are pivotally joined to a series of levers 22 having pads 23 at their ends which depress the keys 24 of some suitable form of adding or recording machine. Hence whenever a row of perforations comes under the series of contacts 12 a key of the adding or recording machine corresponding to the perforations will be operated to print or record a number or a letter.

When any one or more of the permutation bars are moved by these magnets they are engaged by pawls 25, Figs. 1 and 2 and are held in their set positions thereby until the pawls are withdrawn by the action of a cam 26 operating against a pivoted bell crank lever 27. This is done in order to allow sufficient time for the depression and recovery of a key.

By this means the keys of the machine are operated with the same facility as by hand, but it is also necessary to operate the "lever-pull" which, however, is necessarily a slower operation, and for this purpose I have devised the means shown mainly in Fig. 2.

Here one of the depending levers 17 is pivotally connected to a horizontal lever 28 pivoted at 29, and whenever a row of notches in the permutation bars falls opposite this particular lever 17 the latter swings forward, its end is caught by the bar 18 and it, together with the lever 28, is depressed. By this action a pin 30 in its end is depressed into a notch in the end of a lever 31 pivoted to a swinging frame 32, and this pin constitutes a fulcrum about which the lever 31 swings in obedience to a driving force of a cam 33 on a short counter-shaft 34 which is geared by a large gear wheel 35 to a pinion 36 on the shaft 5. This movement of the lever 31 is imparted to the lever 37 and thus operates the lever-pull of the machine. The gearing is so timed that the cam 33 rotates at about one third the speed of the shaft 5, so that assuming the speed of the motor to be 1800 R. P. M. and the worm wheel reduction gear six to one, then the speed of the shaft 5 will be 300 R. P. M. The small counter-shaft 34 being again geared down at three to one, the cam 33 which actuates the lever-pull mechanism, will have a speed of about 100 R. P. M. which is about the rate at which the lever-pulls of adding machines are worked by hand.

As the lever-pull is not operated unless the bar or lever 28 is depressed, the upper end of lever 31 is unrestrained, and under such conditions the cam 33 would merely swing the lever 31 back and forth on its lower pivotal point without other effect.

In order that the cam 33 may always act at the proper instant to perform its allotted functions, I have adopted the device shown in Figs. 1, 2 and 8. In these figures the cam 33 is loose on the counter-shaft 34 and has attached to a hub 38 thereon a spiral spring 39 surrounding the counter-shaft. Normally, the free end of the spring rests upon a spring actuated plate 40 carried by a pin 54. From the lever 28 depends a finger 42 with a beveled or equivalent end which forces to one side the plate 40, when the lever 28 is depressed, and this releases the end of the spring 39.

Normally, the engagement of the end of the spring with the plate 40, which, it will be observed, occurs on each rotation of the shaft 34, when the plate 40 is in its normal position, tends to open the spring, so that it does not bind the counter-shaft, but when the end of such spring is freed, by the depression of the finger 42, the spring coils up and binds the counter-shaft thereby imparting movement to the cam which operates the lever-pull. It will be observed that the cam normally lies against the lever 31 so that it is always in proper position to act when the spring grips the shaft upon which it is mounted. I have shown in Fig. 8 a spring pawl 43 which is usually employed in similar devices to prevent backward movement when the cam is arrested by the reëngagement of the end of the spring with plate 40 after the shaft 34 has made one revolution.

The apparatus, it will be borne in mind, is intended to be operated by either perforated cards or tape and special contacts 12 are used for each. When cards are used the tape contacts are thrown out of operation, and conversely; and for this purpose any convenient means may be employed, such as movable presser fingers or springs 53, Fig. 5, which may be brought to bear on the contacts 12 and keep them depressed, or removed and permit them to rise.

Figure 9:
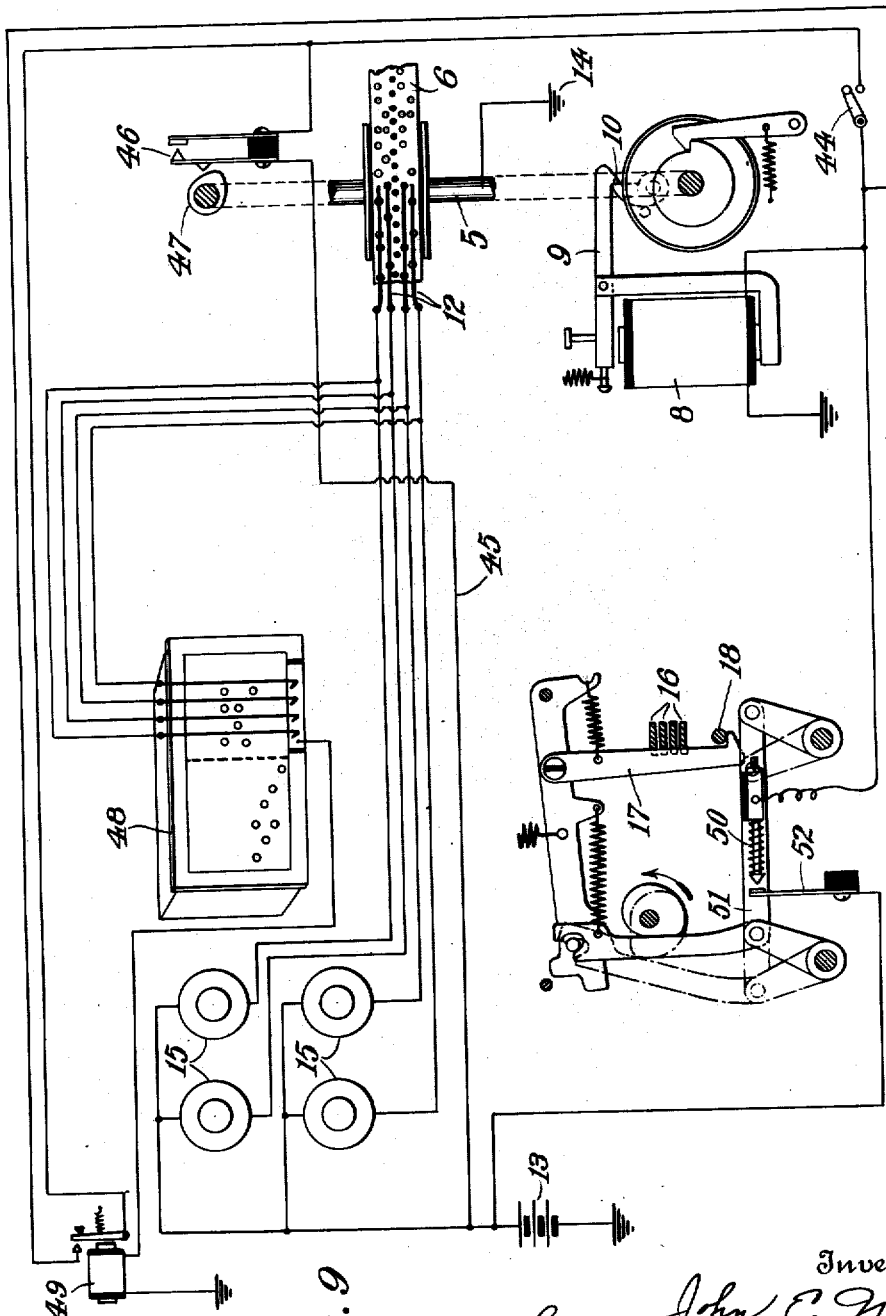
Fig. 9 is a diagrammatic illustration of the circuits and relations of the several parts comprising the instrument.

Referring now to Fig. 9 which illustrates the electrical connections. When the machine is to be used with a tape, a switch 44 is closed which completes the circuit from battery 13, wire 45, a normally closed switch or pair of contacts 46 and magnet 8. This sets the clutch in operation and rotates the shaft 5 which is again started and rotated another time when the cam 47 on shaft 5 closes the contacts 46.

The movements of the shaft 5 being imparted to the tape 6, the perforations thereon are brought under the contacts 12 and the magnets 15, and other parts of the apparatus are operated as has been above described. The machine will continue to operate as long as the switch 44 is closed.

If cards are to be used in lieu of tape, the tape contacts are raised and the contacts over the card holder 48 are lowered. This card holder, shown here only diagrammatically is presumed to have its own mechanism for moving the cards one after another off from a pile held in the box and in so doing to carry their perforations under the contacts 12. Whenever a contact passes a perforation its corresponding magnet 15 is energized and the circuit of a magnet 49 is closed. At such times the shaft 5 is stationary, contacts 46 in engagement and the switch 44 open, but by the energization of magnet 49 a circuit is closed from battery through the contacts 46 and around the switch 44 through the starting magnet 8. Hence the machine will set up the proper combination and print or record the figure corresponding to the line of perforations in the card which had started the clutch. It will be understood from this how the other operations are performed, and it is only necessary to observe that the movement of a card shall be slow enough with reference to the speed of the shaft 5 to insure that the contacts 46 are in engagement whenever a row of perforations in a card come under the contacts 12.

It is essential, moreover, in operating the machine that the lever-pull shall have time to complete its operation whenever it is brought into action. For this purpose a spring contact 50 is mounted on the top bar 51 of the frame 32 which, while the cam 33 is pushing back the lever 31, engages a stationary contact 52 and closes the circuit of the magnet 8. The movement which produces this closure is sufficiently slow to permit the circuit of magnet 8 to remain closed through three revolutions of the shaft 5.

I have in the above described in specific terms a mechanism for carrying out the invention, but it is not my intention to limit my claims to this exact form. For example, I have shown and described permutation bars, but disks or other known devices for accomplishing the same purpose might be used just as well. And so for many other constructive features, equivalent mechanisms may be employed, and I understand that they are, as a matter of fact, included in the more or less specific terms by means of which the invention is defined in its claims.

What I claim is:

1. In a reproducing apparatus operated by perforated cards or tape the combination with an adding machine, of a limited number of contacts for engaging the perforations in the cards or tape, a corresponding series of permutation bars operated by the contacts and means dependent upon the adjustment of said bars for operating the keys of the adding machine according to the position or character of the said perforations.

2. In a reproducing apparatus operated by perforated cards or tape, the combination with an adding machine, a limited number of contacts for engaging the perforations in the cards or tape, a corresponding series of permutation bars operated by circuits closed by the contacts, and levers which are depressed when permitted to swing by the adjustment of the permutation bars for operating the keys of the adding machine according to the character or position of the said perforations.

3. In a reproducing apparatus operated by perforated cards or tape, the combination with an adding machine of levers for operating the keys and the lever-pull of the same, of permutation bars which by their adjustment determine the particular lever or levers to be operated, and a series of contacts under which the perforated cards or tape pass for controlling the position or adjustment of the permutation bars.

4. In a reproducing apparatus operated by perforated cards or a tape, the combination of an adding machine, means controlled by the perforations in the cards or tape for depressing the keys of the adding machine corresponding to the character or position of such perforations and independent slower acting means dependent for operation on the said perforations in the cards for operating the lever-pull.

5. In a reproducing machine operated by perforated cards or tape, the combination of an adding machine, a limited number of contacts for passing over the perforations, a series of permutation bars adjusted by such contacts, and a series of levers capable of movement according to the adjustment of the permutation bars, said levers being adapted when so moved to effect the depression of keys of the adding machine, and one of the said levers being adapted when so moved to operate the lever-pull of said machine.

6. In a reproducing apparatus operated by a perforated type, the combination of an adding machine, continuously operating driving means, a tape carrier intermittently moved by such means, a series of contacts bearing on the tape, a corresponding series of permutation elements adjusted by currents directed through the contacts when passing perforations, and means dependent for operation upon the adjustment of the permutation elements for operating the keys of the adding machine to record in the proper manner the data corresponding to the perforations in the tape.

7. In a reproducing machine operated by perforated cards or tape, the combination of an adding machine, means for operating its keys controlled by the coöperative action of the perforated tape and a series of contacts, means for operating the lever-pull at predetermined times, and means for arresting the action of the driving mechanism while the lever-pull is being operated.

In testimony whereof I hereunto affix my signature.

JOHN EDWARD WRIGHT.